United States Patent [19]

Manjarres

[11] Patent Number: 4,649,534
[45] Date of Patent: Mar. 10, 1987

[54] TELECOMPUTER PACKAGE SWITCHING SYSTEM

[75] Inventor: Jesus Manjarres, Madrid, Spain

[73] Assignee: Compania Telefonica Nacional de Espana, S.A., Spain

[21] Appl. No.: 676,798

[22] Filed: Nov. 30, 1984

[51] Int. Cl.⁴ .............................................. H04Q 11/04
[52] U.S. Cl. ........................................ 370/60; 370/94
[58] Field of Search ....................... 370/60, 94, 85, 67, 370/58, 13, 17; 340/825.06, 825.52

[56] References Cited

U.S. PATENT DOCUMENTS

| | | | |
|---|---|---|---|
| 4,370,743 | 1/1983 | Moran | 370/60 |
| 4,525,830 | 6/1985 | Cohen et al. | 370/94 |
| 4,530,090 | 7/1985 | Priamo et al. | 370/58 |

Primary Examiner—Douglas W. Olms
Assistant Examiner—Wellington Chin
Attorney, Agent, or Firm—McGlew and Tuttle

[57] ABSTRACT

A telecomputer system for processing data from a plurality of subscribers, maintaining its own integrity and operability, and establishing communication between various points in the system, comprises a pair of shared communication paths establishing two main lines of communication and two control units connected to the two control paths. A shared information memory is also connected to the two shared paths. The shared memory is also connected by separate pathways to each of the control units. An information and control console is connected to the control units for accepting and providing information and display for an operator. A plurality and in particular up to 32 packet switches are also connected to the two shared communication paths for controlling data and signals from subscribers, the receipt and transmission of data by means of line interfaces, control data transfer between one package switch to another, the control of exchange of information with the shared memory, the treatment of control information and supervision exchange with one or each of the control units, maintenance of the separate packet switches and measurements and statistics for each individual packet switch.

8 Claims, 2 Drawing Figures

TELECOMPUTER PACKAGE SWITCHING SYSTEM

FIELD AND BACKGROUND OF THE INVENTION

The present invention relates in general to communication systems between computers, and in particular to a new and useful telecomputer system having two control units and up to thirty two packet switches all interconnected by one or more communication lines and including a shared memory connected to the communication line.

Telecomputing systems are known which utilize a plurality of computer terminals which can be interconnected by a telephone or other communication lines for transferring and processing information according to various programs stored at various locations and in various devices of the system.

SUMMARY OF THE INVENTION

The present invention refers to a Packet Switching System that has been designed to be used as a Switching Center and as a concentrator in data communication networks that use the Packet Switching Technique. The network centers made up by this system carry out the package switching in accordance with the virtual circuits technique. By means of this technique, the packet switching network controls the communication between two subsribers without a physical connection between the same being established. Thanks to the storage and retransmission facilities available in the network centers, the subsribers remain virtually connected to each other while the communication lasts.

Globally, the functions that the system carries out are the following:
Control functions;
Signalling functions;
Packet switching functions; and
Man-machine communication functions.

The purpose of the signalling functions is to exchange information with the subscriber's terminal and with other network centers in order to establish, maintain and release communications. The purpose of the packet switching functions is to store, treat, retransmit packet between virtual input circuits and virtual output circuits. The purpose of the man-machine communication functions is the interaction and dialogue between the operator and the system for the purpose of operation and maintenance.

The structure of the system is based on the function distribution and load distribution philosphy. In accordance with the function distribution philosophy the center is structured on the basis of units specialized in carrying out the distinct aforementioned functions. Attending to the load distribution concept, the system divides up the messages handling loads among the distinct parts of its functional units and equips the redundant units, where the reliability of the system requires it, in such a way that under normal working the message handling load is shared and under special conditions, one of them can handle the entire load of the system. Accordingly an object of the present invention is to provide a telecommunication packet switching system which comprises a shared path in the form of a communication line, two control units connected to the communication line, one shared information memory connected to the communication line, a console connected to the two control units and a plurality of packet switches connected to the communication line with the control units and packet switches having means for containing and processing programs including application programs, development and management programs, utility programs, maintenance programs and testing programs.

A further object of the invention is to provide a telecomputer system which can receive and process information from multiple locations and which is adaptable to overcome a variety of fault siutations while remaining functional.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
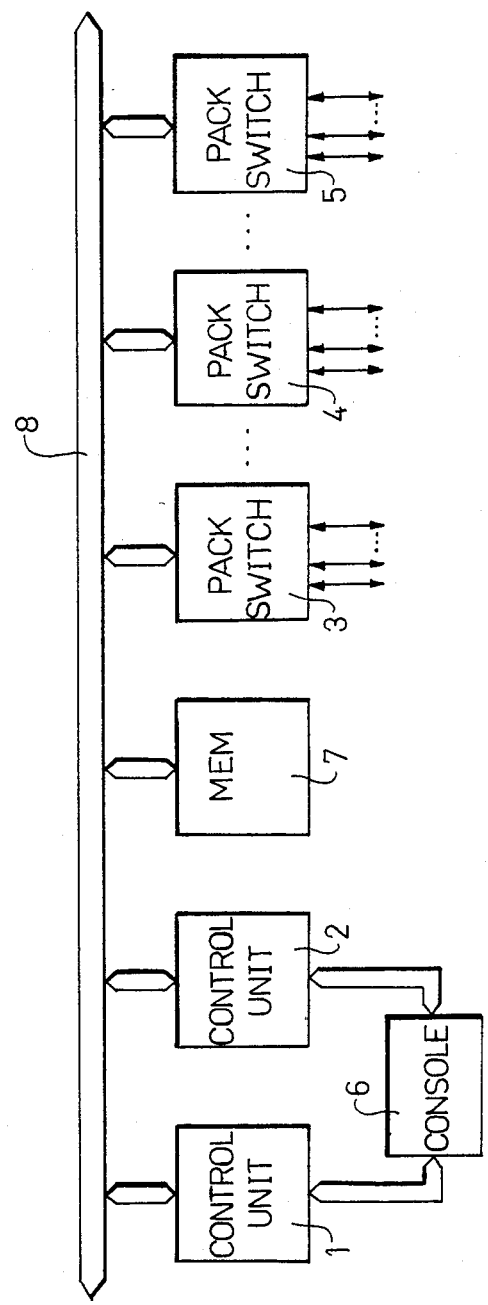
FIG. 1 is a schematic block diagram showing the general layout of the telecomputer system in accordance with the invention.

The basic organization of the inventive system is the one shown in FIG. 1. In this structure, the control functions are assigned to the control units 1 and 2, the signalling and package switching functions are assigned to the package switches 3,4,5, and the man-machine communication functions are assigned to the auxiliary units that make up the system console 6. The shared memory 7 carries out the functions of storing data shared by other units of the system. The inplant information transfer paths carry the intercommunication among the distinct units of the system.

Physical Structure of the Center

The center adopts a multiprocessing structure in which the distinct processing units intercommunicate between each other and with the shared memory by means of a shared information transfer paths system.

Figure 2:
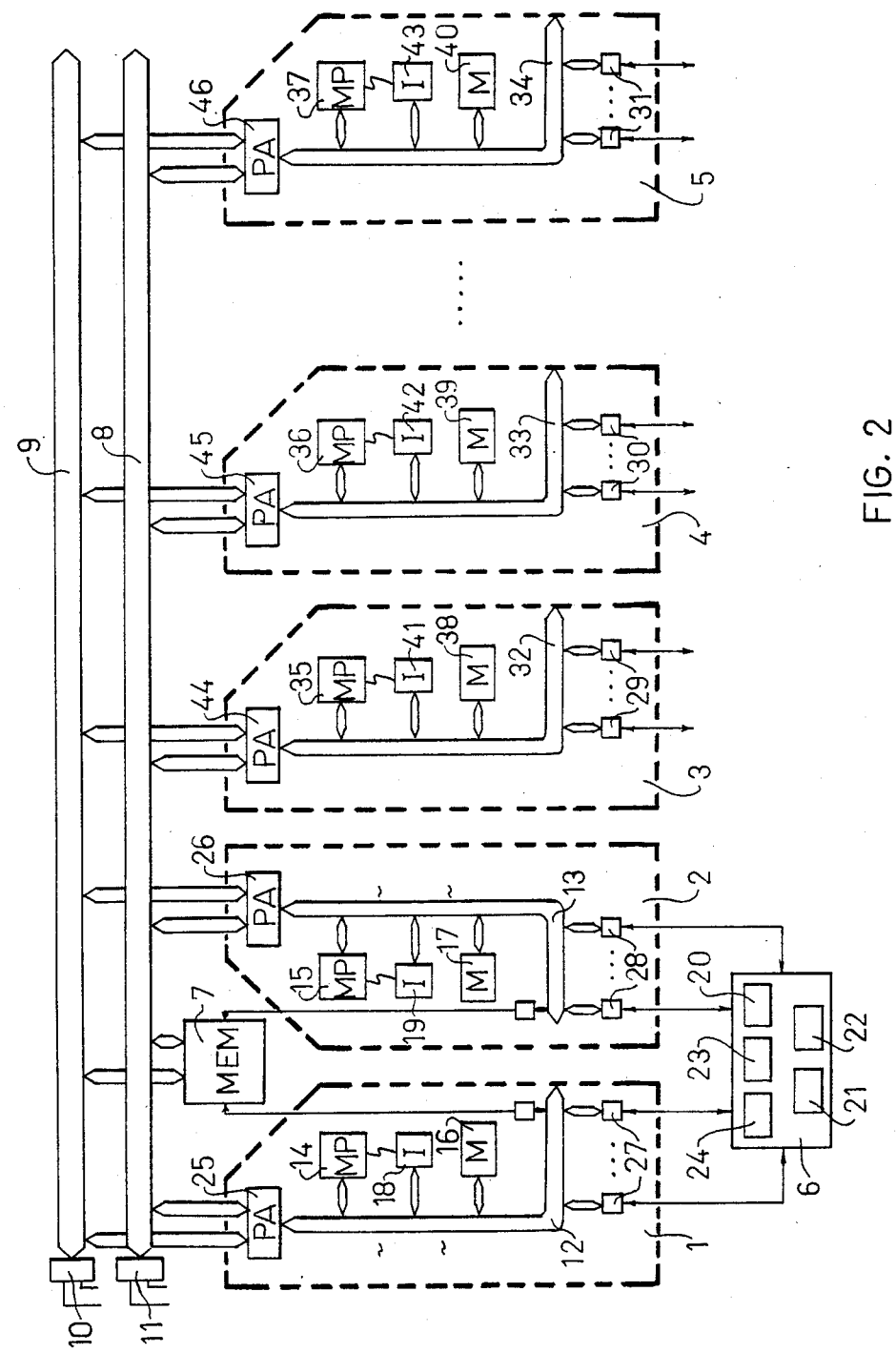
FIG. 2 is a more detailed block diagram of the inventive telecomputer system.

The structure of the center is shown in Fig.2. The group of processing functions of the center are carried out by a single type of processing unit, which can be modularly increased in relationship to the needs of the center. This processing unit is made up of a microprocessor with its logic and associated periphery, with its in-plant store and with a certain number of interfaces for the device connection. According to whether these devices are peripheral for man-machine communication or if they are transmission lines, the processing unit is called the control unit (1 and 2) or the package switch (3,4,5) respectively.

All the processing units 1 and 2 can communicate between each other directly through a shared path 8 and 9. The shared memory 7 can also be reached by all the processing units through a shared path, its storage capacity being able to be increased by 32 kilobyte modules, according to the needs of the center, up to 1 megabyte.

The shared path 8,9 is duplicated for reasons of reliability and access to said paths is governed by devices called path controllers 10 and 11. The shared memory information travels along these shared paths as much as the data interruption and transfer information between the processing units do. The console 6, that contains the distinct peripheral units necessary for man-machine communication, is connected to 1 and 2, by means of the appropriate perhipheral interfaces. The transmission lines are divided up among the package switches or computers 3,4,5, they being connected by means of the interfaces of the line which will be indicated later on.

The internal structure of the processing units is described as follows:

Control Units

The control units have the functions:

Supervision of the working of the system;

Automatic maintenance of the system;

Control of the peripherals of the system; and

Measurements and statistics of the system.

The load that carrying out these functions implies is divided up among the two control units 1 and 2 in the normal working of the center. In the event of a fault, a single control unit 1 or 2 can handle all the functions. In order to handle the fault situations, each one of the control units 1 and 2 knows the operative state of the other one at all times.

Internally each control unit 1 and 2 makes use of an in-plant path 12 and 13 through which the peripherals intercommunicate with the processor. The processor 14 and 15 executes the control programs that it has stored in its in-plant store 16 or 17. The peripheral devices are connected, by means of their corresponding interfaces to the in-plant path and they interrupt the processor in order to exchange information by means of the interruption control perhipheral 18 and 19. These peripheral devices comprising a peripheral store, an incidence register unit 21, a control and presentation unit 22, an alarm unit 23 and a day clock 24, make up the system console.

The peripheral store 20 is a massive storage device that helps with programming the system. The incidence register unit registers in writing all the incidences of the working of the center. The control and presentation unit permits the operator to have interactive dialogue with the machine. The alarm unit 23 contains the sound and luminous alarms of the system. The day clock 24 controls the time count of the clocks of the distinct processing units and it exteriorizes the in-plant hour by a console.

Likewise there are interfaces for the connection of the shared memory of the system of the in-plant path inside 1 and 2 in such a way that the control units 1 and 2 can maintain the the control of the shared memory without using the shared path 8,9. Similary, the path controllers 10 and 11 have connections to the in-plant paths of the control units 1 and 2 so that the latter can control them without using the shared path.

The maximum number of perhipherals that can be connected to a control unit is 40. Access to the shared path for carrying out the transfer of information with the rest of the control units is controlled by a device called the path access perihereral 25,26.

Package Switches

The following basic functions are assigned to the packet switches:

Control of the signalling of subscribers and of the network;

Control of the receiving transmission of data by means of the line interfaces;

Control of data transfer between the packet switch itself and another packet switch by means of the shared paths;

Control of the exchange of information with the shared memory 7 by means of the shared paths 8,9 and the control units;

Treatment of the control information and supervision exchanged with a control unit and other packet switches by means of the shared paths;

Maintenance of the system; and

Measurements and statistics of the subsystems.

A network center can be equipped with up to 32 packet switches. The internal structure of a packet switch is exactly the same as the one of a control unit, except that instead of the peripheral interfaces 27 and 28, it has line interfaces 29,30,31. Thus, a packet switch consists of an in-plant path 32, 33 or 34 to which the following are connected: The processor 35,36,37, the in-plant store 38,39,40, the interruption control peripheral 41,42,42, the line interfaces 29,30,31 and the path access peripheral 44, 45,46.

The line interfaces, through which the communication lines arrive at the package switches, are specialized for asynchronic and HDLC lines. The maximum number of lines that can be connected to a packet switch depends on the speed of the same and on its mode of transmission, being able to vary between 10 and 40 lines.

Working of the Physical Structure

The previously described physical structure is the material medium of the system programming. This physical structure supplies the basic information transfer devices among their distinct units that allow for the system programming to carry out the control supervision and packet switching functions.

Information transfer among the distinct units of the system takes place as is described hereafter.

When a peripheral or line interface 27 to 21 receives a control signal from its associated peripheral or line, which indicates to it the beginning of an information block transmission, it interrupts the processor (14,15,35,36 or 37) by means of the interruption control peripheral (18,19,41, 42 or 43 respectively). The processor prepares the direct access to the store of the interface in question so that it carries out the direct transfer to the in-plant store of the information block that comes through said interface. The processor assigns the in-plant store space(16,17,38,39 or 40) and organizes the direct access to the store in order to catenate a block if it is necessary.

Upon completing the transfer of each block, the interface interrupts the processor once again, informing it about the length of the block. When the processor disposes of the entire block in its in-plant store it processes it and it is prepared to be transferred to the corresponding destination unit. This unit may be the same unit or another processing unit. Before carrying out the transfer, the processor makes sure that the destination unit can receive the block.

Once it is sure of this, the processor asks its path access peripheral (25,26,44, 45 or 46) to capture a shared path (8 or 9).

In the event of a transfer to another processing unit, the source path access peripheral signals in the shared path the direction of the path access peripheral of the destination processing unit and its own direction. Upon identifying its direction, the destination path access peripheral verifies that there is available space assigned to the source processor in the in-plant store of the destination processor. The destination path access peripheral prepares its circuits of direct access to the in-plant store and it indicates it to the source path access peripheral. Then the transfer of a block or blocks takes place from one in-plant store to another, by means of extraction through direct access to the store of the source path access peripheral and feeding through direct access to the store of the destination path access peripheral, after verifying parities. Once the transfer is complete the destination processor communicates its availability to the source processor.

If the transferred block has to go out through a line interface or a perhipheral interface, the transfer device from the in-plant store to said interface is similar to the one that was previously described for the transfer in the opposite direction. Information transfers for the purposes of control or supervision among units is carried out by means of reading or direct writing of the input-/output registers that are disposed of in the distinct path access peripherals. There is also a device through which the in-plant and shared paths are connected in a transparent manner for the purposes of reading or simple writing of the shared memory by the processing units. In this case, the processing unit contemplates the shared memory as an extension of its in-plant store.

The control units perform the functions of supervision, control and maintenance of the shared path.

Programming Structure of the System

The programs existing in the network centers are structured in accordance to the following classifications:
  Basic operating system programs;
  Communication lines control programs;
  Application programs;
  Programs for developing and control centers;
  Utility and assistance programs; and
  Test and maintenance programs.

Basic Operating System Programs

These programs operate the facilities of the system, understanding as such: processors, stores and input-/ouput parts of the system. The main activities that these programs perform as follows:

Task Control

This is the basic activity on which the whole operating system rests. By means of it the tasks are activated, prepared, blocked or delayed and the exchange of messages among tasks and with the interruption system are controlled; keeping in mind the priority and reentry of each task.

Fault Retrieval

There are programs that confront the faults of the system, keeping the redundant parts and the fault tolerant parts in mind which the system has and notifying the outside about the irretrievable faults.

Store Control

The system has programs specialized in unwinding the control activities of the shared memory and of the in- plant stores.

Path Control

This activity organizes the utilization of the shared and in-plant paths of the system, keeping the interruptions of the packet switches and the control and the access to the shared memory in mind.

Interruption Control

The programs that perform this activity look after the interruptions, keeping their masking and priority in mind, and channeling them towards the adequate operator.

Times Control

These programs control the assignment of times to the entire system, keeping the necessary synchronization of all the processing subsystems in mind.

Loads and Dumping Control

In this activity the loads and programs dumping are considered, both in the local from/towards the peripheral store, as well as in remote from/towards another network center.

System Generations

This activity considers both the parametric generations as well as the dynamic reconfigurations of the system.

Peripherals Control

There are programs specialized in the operation of each one of the peripherals of the system, understanding as such: Line interfaces, peripheral store, control and presentation unit (22), incidence register unit (21), and the alarm unit (23).

Communication Lines Control Program

These programs have the following functions:
(a) Control the different line protocols that the system supports.
(b) Transfer the information coming from the lines to the distinct application programs which must process it.
(c) Receive from the application programs the information that they supply to them and transmit it by the line that is indicated to them.

The basic tasks to be carried out by these programs are:
  Operation of high speed lines with HDLC procedure;
  Operation of average speed lines with the BSC transparent and non-transparent procedures, RETD duplex procedure and terminal control procedures with more than 1200 bps, synchronous or asynchronous with or without multidrop; and
  Operation of low speed lines with control procedure for NCR-270, IBM-2970, OLIVETTY-349 AB and BI and Teletype terminals.

Application Program

These programs have their own entity and they are identified with the different functional specifications of the special data transmission network in which they are based.

The basic functions of the application programs are as follows:
(a) To receive from the lines control programs the information that they supply to them and to process it.
(b) To transfer to the lines control programs the information generated in said processing.

Generically there are two types of application; the lines concentration one and the switching one.

Some of the tasks that the application programs carry out are:

Packing and unpacking data:
Information packet processing;
Control packet generation and processing; and
message handling routing.

Programs for Unwinding and Control Centers

These programs have the following functions:
(a) Facilitate the developing of the programs, which implies: compilation, assembly, debugging and tests; and
(b) To give the medium necessary for the utilization of the center as a developing center itself, and as a network controller center as an added services center.

By means of this group of programs the physical structure of the control applications system is obtained.

Utility and Assistance Programs

The functions of these programs are:
(a) To acquire information during the actual working of the center for the purposes of measurements, statistics and out-plant control of the performance of the same.
(b) To facilicato the working of the center.

Some of the tasks that these programs carry out are:
Engineering/Alteration of the shared, in-plant or peripheral store;
Observation of the message handling from lines, centers or the network;
Following packets through the system and network;
Obtaining measurements and statistics from: Network, system, subsystems, applications, tasks, centers and terminals; and
Dynamic dumping from the shared, in-plant or peripheral store or in-plant input/output peripherals or remote control centers.

Some of the tasks that are developed "in line", during the working of the center, and others are carried out "out of line" and being based on the data collected during work in real time of the center.

Test and Maintenance Programs

These programs have the following functions:
(a) To provide media for the preventive maintenance of the system.
(b) Once a fault is presented, provide the most adequate means for its diagnostic, elimination and correct operation tests even under the most unfavorable conditions.

These types of programs have no reason to be residents and they can be loaded via operation, considering them to be divided into two large groups.

Machine dedicated programs.

For their run, be it under control or not of the basic operating system, it is not possible to overlap the run of other programs.

Service test programs.

These programs run under control of the operating system and they share the facilities of the system with the remaining ones that are active.

Organization

All the programs are modular and structured and they can have their data and instructions, in the in-plant share as well as in the shared memory, being able to be executed both in packet switches, as well as in control units.

One must distinguish between:
(a) Programs that carry out shared functions for all of the processing ssubsystems; and
(b) Programs that carry out specific functions of some processing subsystems.

Type (a) programs are present in all of the processing substems, normally having their instructions in the in-plant store and their data partly in the in-plant store and partly in the shared memory. All the instructions contained in the in-plant store are redundant.

Type (b) programs are only present in those processing subsystems that have the function that they carry out assigned to it. The instructions are likewise in the in-plant store and their data can be partly in the in-plant store and partly in the shared memory. The redundancy only exists in the inplant store of those processing subsystems that carry out the same specific functions.

The pattern of programs of any processing subsystems is obtained by choosing from the different program groups mentioned in the previous section those that carry out the functions that said processing subsystem has entrusted to it.

While a specific embodiment of the inventin has been shown and described in detail to illustrate the application of the principles of the invention, it will be understood that the invention may be embodied otherwise without departing from such principles.

What is claimed is:

1. A telecomputer system for processing data including data received from subscribers, comprising:
a shared communication path;
two control units connected to said shared communication path, each independently capable of controlling an automatic maintenance of the system, the taking of measurements and statistics of the system and controlling a plurality of peripherals for the system;
a shared memory connected to said shared communication path for receiving, storing and transmitting stored information from a plurality of sources on said shared communication path;
a console connected to said two control units for receiving and displaying information from said control units and for supplying information to said control units; and
a plurality of packet switches each connected to said shared communication path and each for controlling data from subscribers of the system, for controlling the receipt and transmission of data using line interfaces, for controlling data transfer to other packet switches and to at least one of said control units, for controlling exchange of information with said shared memory and for controlling internal maintenance, measurements and statistics for itself.

2. A telecomputer system according to claim 1, including up to 32 of said packet switches connected to said shared communication path.

3. A telecomputer system according to claim 2, wherein each of said control units comprises an in-plant path, a microprocessor connected to said in-plant path for executing control programs, an in-plant memory connected to said in-plant path for storing data and the control programs, an interruption control peripheral connected to said in-plant path and to said microprocessor for controlling activation and de-activation of said microprocessor, a path access peripheral connected between said in-plant path and said shared communication path for establishing communication between said control unit and said shared communication path, and from 1 to 40 peripheral interfaces connected to said in-plant path, each of said peripheral interfaces connected to said console for establishing communication between said console and said control unit.

4. A communication system according to claim 3, wherein each of said packet switches comprises an in-plant path, a microprocessor connected to said in-plant path for executing control programs, an in-plant memory connected to said in-plant path for storing data and the control programs, an interrupt control peripheral connected to said in-plant and said microprocessor for activating and de-activating said microprocessor, a path access peripheral connected between said in-plant path and said shared communication path for establishing communication between said packet switch and said shared communication path, and from 1 to 40 line interfaces connected to said in-plant path for receiving and transmitting data to and from subscribers of the telecomputer system.

5. A telecomputer system according to claim 4, wherein said shared memory is modular and is enlargeable to a capacity of up to 1 megaoctet, said shared memory connected to one of said peripheral interfaces of each of said control units for direct control by each of said control units.

6. A communication system according to claim 2, wherein each of said packet switches comprises an in-plant path, a microprocessor connected to said in-plant path for executing control programs, an in-plant memory connected to said in-plant path for storing data and the control programs, an interrupt control peripheral connected to said in-plant path and said microprocessor for activating and de-activating said microprocessor, a path access peripheral connected between said in-plant path and said shared communication path for establishing communication between said package switch and said shared communication path, and from 1 to 40 line interfaces connected to said in-plant path for receiving and transmitting data to and from subscribers of the telecomputer system.

7. A telecomputer system according to claim 2, including an additional shared communication path connected to each of said two control units, said shared memory and each of said plurality of packet switches.

8. A telecomputer system according to claim 1, wherein said shared memory is modular and enlargable, each control unit having at least one interface, said shared memory being connected to and directly controllable by each of said control units through its interface.

* * * * *